(12) United States Patent
Neitemeier et al.

(10) Patent No.: US 11,672,193 B2
(45) Date of Patent: Jun. 13, 2023

(54) METHOD FOR THE OPERATION OF A SELF-PROPELLED AGRICULTURAL WORKING MACHINE

(71) Applicant: CLAAS E-Systems KGaA mbH & Co KG, Dissen A.T.W. (DE)

(72) Inventors: Dennis Neitemeier, Lippetal (DE); Boris Kettelhoit, Guetersloh (DE); Andreas Skiba, Bielefeld (DE); Thilo Krause, Glinde (DE)

(73) Assignee: CLAAS E-SYSTEMS GMBH, Dissen am Teutoburger Wald (DE)

( * ) Notice: Subject to any disclaimer, the term of this patent is extended or adjusted under 35 U.S.C. 154(b) by 1051 days.

(21) Appl. No.: 16/145,868

(22) Filed: Sep. 28, 2018

(65) Prior Publication Data
US 2019/0098825 A1   Apr. 4, 2019

(30) Foreign Application Priority Data

Sep. 29, 2017  (DE) .......................... 102017122711.3

(51) Int. Cl.
| | |
|---|---|
| *G06F 7/70* | (2006.01) |
| *G06G 7/00* | (2006.01) |
| *G06G 7/76* | (2006.01) |
| *A01B 69/04* | (2006.01) |
| *G05D 1/02* | (2020.01) |

(Continued)

(52) U.S. Cl.
CPC ............ *A01B 69/008* (2013.01); *A01F 15/04* (2013.01); *B30B 9/305* (2013.01); *B30B 9/306* (2013.01);
(Continued)

(58) Field of Classification Search
CPC . A01B 69/008; A01B 69/001; B30B 15/0035; B30B 9/305; B30B 9/3089;
(Continued)

(56) References Cited

U.S. PATENT DOCUMENTS

| | | | |
|---|---|---|---|
| 6,336,051 B1 * | 1/2002 | Pangels | A01B 79/005 700/207 |
| 9,221,396 B1 * | 12/2015 | Zhu | G01S 7/40 |

(Continued)

FOREIGN PATENT DOCUMENTS

DE   102015116586 A1   3/2017

OTHER PUBLICATIONS

Giulio Reina et al: "Towards Autonomous Agriculture: Automatic Ground Detection Using Trinocular Stereovision," Sensors Sep. 12, 2012, vol. 12, No. 12, pp. 12405-12423, XP055401661, D01:10.3390/s120912405.

(Continued)

*Primary Examiner* — Harry Y Oh
(74) *Attorney, Agent, or Firm* — Collard & Roe, P.C.

(57) ABSTRACT

A method for the operation of a self-propelled agricultural working machine has at least one working element and a driver assistance system for generating control actions within the working machine. A sensor arrangement for generating surroundings information is provided, and the driver assistance system generates the control actions based on the surroundings information. The sensor arrangement comprises a camera-based sensor system and a laser-based sensor system, each of which generates sensor information regarding a predetermined, relevant surroundings area of the working machine. The sensor information of the camera-based sensor system is present as starting camera images. The starting camera images are segmented into image segments by an image processing system according to a segmentation rule, and the segmented camera images are combined by a sensor fusion module with the sensor information from the laser-based sensor system.

12 Claims, 3 Drawing Sheets

(51) Int. Cl.
    *B30B 15/00*     (2006.01)
    *B30B 9/30*     (2006.01)
    *A01F 15/04*     (2006.01)

(52) U.S. Cl.
    CPC .......... *B30B 9/3078* (2013.01); *B30B 9/3089* (2013.01); *B30B 15/0035* (2013.01); *G05D 1/0242* (2013.01); *G05D 1/0246* (2013.01); *G05D 2201/0201* (2013.01)

(58) Field of Classification Search
    CPC ....... B30B 9/3078; B30B 9/306; A01F 15/04; G05D 1/0242; G05D 1/0246; G05D 2201/0201; G05D 1/0248; A01D 75/20; A01D 41/1278
    USPC .......................................................... 701/50
    See application file for complete search history.

(56) References Cited

U.S. PATENT DOCUMENTS

| | | | |
|---|---|---|---|
| 10,762,358 B2 * | 9/2020 | Myers | G06V 10/764 |
| 2003/0184747 A1 | 10/2003 | Diekhans et al. | |
| 2007/0021915 A1 * | 1/2007 | Breed | G08G 1/164<br>701/301 |
| 2012/0081542 A1 * | 4/2012 | Suk | G06K 9/00805<br>348/139 |
| 2012/0081544 A1 * | 4/2012 | Wee | G01S 17/931<br>348/140 |
| 2013/0314221 A1 * | 11/2013 | Taylor | G06T 7/11<br>340/435 |
| 2014/0274205 A1 * | 9/2014 | Goszyk | G01S 17/93<br>455/556.1 |
| 2017/0108863 A1 * | 4/2017 | Chundrlik, Jr. ... | B60W 50/0205 |
| 2018/0048801 A1 * | 2/2018 | Kiser | H04N 23/57 |
| 2018/0067194 A1 * | 3/2018 | Wodrich | G01S 13/931 |
| 2018/0067489 A1 * | 3/2018 | Oder | G05D 1/0255 |
| 2018/0067495 A1 * | 3/2018 | Oder | G05D 1/0255 |
| 2018/0067966 A1 * | 3/2018 | Oder | G05D 1/0276 |
| 2020/0031283 A1 * | 1/2020 | Nakasho | B60R 1/00 |
| 2020/0284883 A1 * | 9/2020 | Ferreira | G01S 7/4816 |

OTHER PUBLICATIONS

European Search Report dated .Feb. 28, 2019 in European Application No. EP 18 18 5672 with English translation of the relevant parts.

* cited by examiner

METHOD FOR THE OPERATION OF A SELF-PROPELLED AGRICULTURAL WORKING MACHINE

CROSS-REFERENCE TO RELATED APPLICATIONS

This application claims priority under 35 USC 119 of German Application No. 102017122711.3, the disclosure of which is herein incorporated by reference.

BACKGROUND OF THE INVENTION

The invention relates to a method for the operation of a self-propelled agricultural working machine according to the preamble of and to such a self-propelled agricultural working machine.

The term "self-propelled agricultural working machine" is to be broadly understood in the present case. This term encompasses not only harvesting machines such as combine harvesters and forage harvesters, but also towing vehicles such as tractors, or the like.

With respect to the operation of a self-propelled agricultural working machine of the type under discussion, the sensor-based monitoring of the surroundings of the working machine is taking on increasing significance. Due to the fact that the surroundings of the working machine are not present in a standardized form which is easily detectable with the aid of sensors, but rather has a non-deterministic structure within certain limits, the sensor-based detection of predetermined characteristics of the surroundings of the working machine is a challenge.

The known method as described in German Application No. DE 10 2015 116 586 A1, on which the invention is based, provides, in one variant, a sensor arrangement which includes a camera-based sensor system and a laser-based sensor system. In this case, characteristics of the surroundings are detected on the basis of the sensor information from these two sensor systems. A comparatively compute-intensive methodology is required for this purpose, in the case of which an intuitive representation of the particular detected characteristics of the surroundings also readily results.

SUMMARY OF THE INVENTION

It is therefore an object of the invention to configure and refine the known method in such a way that the sensor-based detection of predetermined characteristics of the surroundings of the working machine as well as a clear representation of the particular detected characteristics are possible.

This object is accomplished by a method for the operation of a self-propelled agricultural working machine comprising at least one working element and a driver assistance system for generating control actions within the working machine, wherein a sensor arrangement for generating surroundings information is provided, and wherein the driver assistance system generates the control actions based on the surroundings information. The sensor arrangement comprises a camera-based sensor system and a laser-based sensor system, each of which generates sensor information regarding a predetermined, relevant surroundings area of the working machine.

The sensor information of the camera-based sensor system is present as starting camera images. The driver assistance system comprises an image processing system for processing the starting camera images, the starting camera images are segmented into image segments by the image processing system according to a segmentation rule, a sensor fusion module is provided, and the segmented camera images are combined by the sensor fusion module with the sensor information from the laser-based sensor system.

Of essential importance is the principle consideration of initially segmenting the camera images from the camera-based sensor system and subsequently combining the segmented camera images with the sensor information from the laser-based sensor system.

Specifically, it is provided that the driver assistance system comprises an image processing system for processing the camera images, wherein the camera images are segmented into image segments by the image processing system according to a segmentation rule, wherein a sensor fusion module is provided, and wherein the segmented camera images are combined, by the sensor fusion module, with the sensor information from the laser-based sensor system.

The proposed method is advantageous insofar as the segmentation of the camera images results in a considerable reduction of the volume of data to be processed, which represents the sensor information of the camera-based sensor system. The application of the sensor information of the laser-based sensor system within the scope of the sensor fusion is basically an enrichment of the segmented camera image, which is associated with a corresponding increase in the information content of the segmented camera image. The image segments enriched in the aforementioned sense can be superimposed on the original camera image in an easy way, thereby yielding an intuitive display of even complex surroundings conditions. The enriched image segments are to be classified in a particularly easy way, as explained further below.

The laser-based sensor system is preferably a sensor system in which the sensor information is height information relative to the field plane. The field plane is the plane, along which the relevant surroundings area extends. Generally speaking, this is a horizontal plane, provided the relevant surroundings area does not have a slope with respect to the horizontal plane. The height of the crop, the height of obstacles or the like, can therefore be detected with the aid of the laser-based sensor system.

Preferably, the relevant surroundings area is detected by the camera-based sensor system as well as by the laser-based sensor system. This means, a set of sensor information from the laser-based sensor system is assigned to each image segment. Correspondingly, height information, at the least, is assigned to at least a portion of the image segments in each case. The image segments enriched in this way allow for a particularly simple detection of characteristics of the surroundings of the working machine. In particular, a classification of the image segments is simplified, since not only are the outline and the coloring available for classifying the image segments, but height information is available as well. This is advantageously utilized within the scope of the classification of the image segments.

Very different advantageous possibilities are conceivable for the class property for defining an upper class. In one embodiment, the class property of a class is defined, for example, by the existence of crop to be harvested. It is also conceivable that the class property of a class is defined by the existence of a living obstacle or a non-living obstacle. Other possibilities of the definition of the class property can be envisioned as well.

Other embodiments relate to the generation of a display image by the image processing system, in which the starting camera image is superimposed with at least one portion of the classified image segments. The color scheme of the image segments and the selective display of the image segments of predetermined classes form the basis for a particularly intuitive and clear display of the characteristics of the relevant surroundings area.

Other embodiments relate to advantageous control actions of the driver assistance system. For example, it can be provided that a control action is the output of the display image via the human-machine interface of the driver assistance system. Alternatively or additionally, the output of a warning message via the human-machine interface can be provided depending on the position of the classified image segments. In one particularly preferred embodiment, the driver assistance system automatically carries out an emergency routine, provided a classified image segment represents an obstacle in the future route of the working machine. In the simplest case, the emergency routine is a stop routine for stopping the working machine. Due to the fact that the sensor fusion according to the invention allows for a relatively high level of certainty in the detection of obstacles, the automatic execution of the emergency routine is associated with a considerable increase in the operational reliability of the working machine.

According to yet another teaching, which has independent significance, a self-propelled agricultural working machine for carrying out a method according to the invention is claimed as such. Reference is made to all embodiments which are suitable for describing the working machine as such.

BRIEF DESCRIPTION OF THE DRAWINGS

The invention is explained in the following in greater detail with reference to a drawing representing only one exemplary embodiment. In the drawings.

DETAILED DESCRIPTION OF THE EMBODIMENTS

Figure 1:
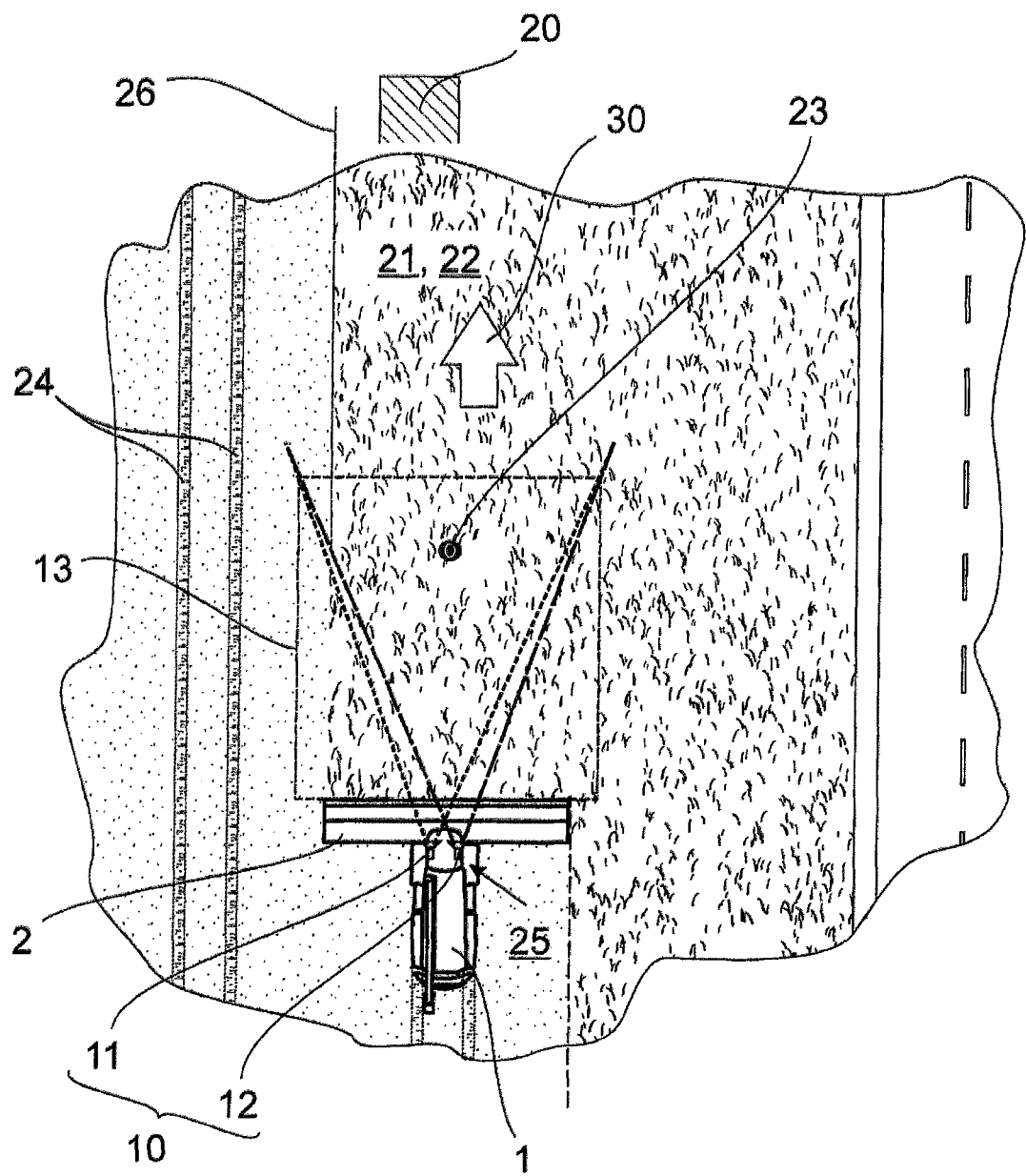
FIG. 1 shows a view from above of a self-propelled agricultural working machine according to the invention.

The approach according to the invention can be applied on a wide range of self-propelled agricultural working machines. These include combine harvesters, forage harvesters, towing vehicles, in particular tractors, or the like. In the exemplary embodiment which is represented and, in this case, is preferred, the working machine 1 is a combine harvester which is equipped with a front attachment 2 in the usual way. FIG. 1 shows the working machine 1 from above during the harvesting process.

The working machine 1 according to the invention is equipped with at least one working element 3-8. A working machine 1 designed as a combine harvester preferably comprises the working elements ground drive 3, header 4, threshing unit 5, separating device 6, cleaning device 7, and spreading device 8.

The working machine 1 is further equipped with a driver assistance system 9 for generating control actions within the working machine 1. The control actions can relate, on the one hand, to the display of information for the user and, on the other hand, to the control and parametrization of the working elements 3-8.

Moreover, a sensor arrangement 10 for generating surroundings information is assigned to the working machine 1, wherein the driver assistance system 9 generates the control actions on the basis of the surroundings information. The sensor arrangement 10 comprises a camera-based sensor system 11 and a laser-based sensor system 12, both of which are situated on the working machine 1, preferably in a position which is elevated with respect to the field plane. The two sensor systems 11, 12 each generate sensor information regarding a predetermined, relevant surroundings area 13 of the working machine 1. In the exemplary embodiment which is represented and, in this case, is preferred, the relevant surroundings area 13 is defined as an area in front of the working machine 1 having a predetermined shape and size.

Preferably, it is provided that the detection ranges of the two sensor systems 11, 12 overlap. The sensor information of the camera-based sensor system 11 is available as starting camera images 14 which can be preprocessed according to the application. The starting camera images 14 are continuously, preferably cyclically, generated by the camera sensor system 11 and are correspondingly sequentially processed in a way according to the invention, which is to be explained below. The starting camera images 14 are therefore a series of images.

The camera-based sensor system 12 preferably comprises at least one camera, in particular at least one color image camera, for generating the starting camera images 14. The camera can be a 2D camera or a 3D camera. The laser-based sensor system 12 is preferably equipped with at least one distance-measuring laser sensor, in particular a laser scanner. In one particularly preferred embodiment, the laser-based sensor system 12 comprises at least one LIDAR sensor.

Figure 2:
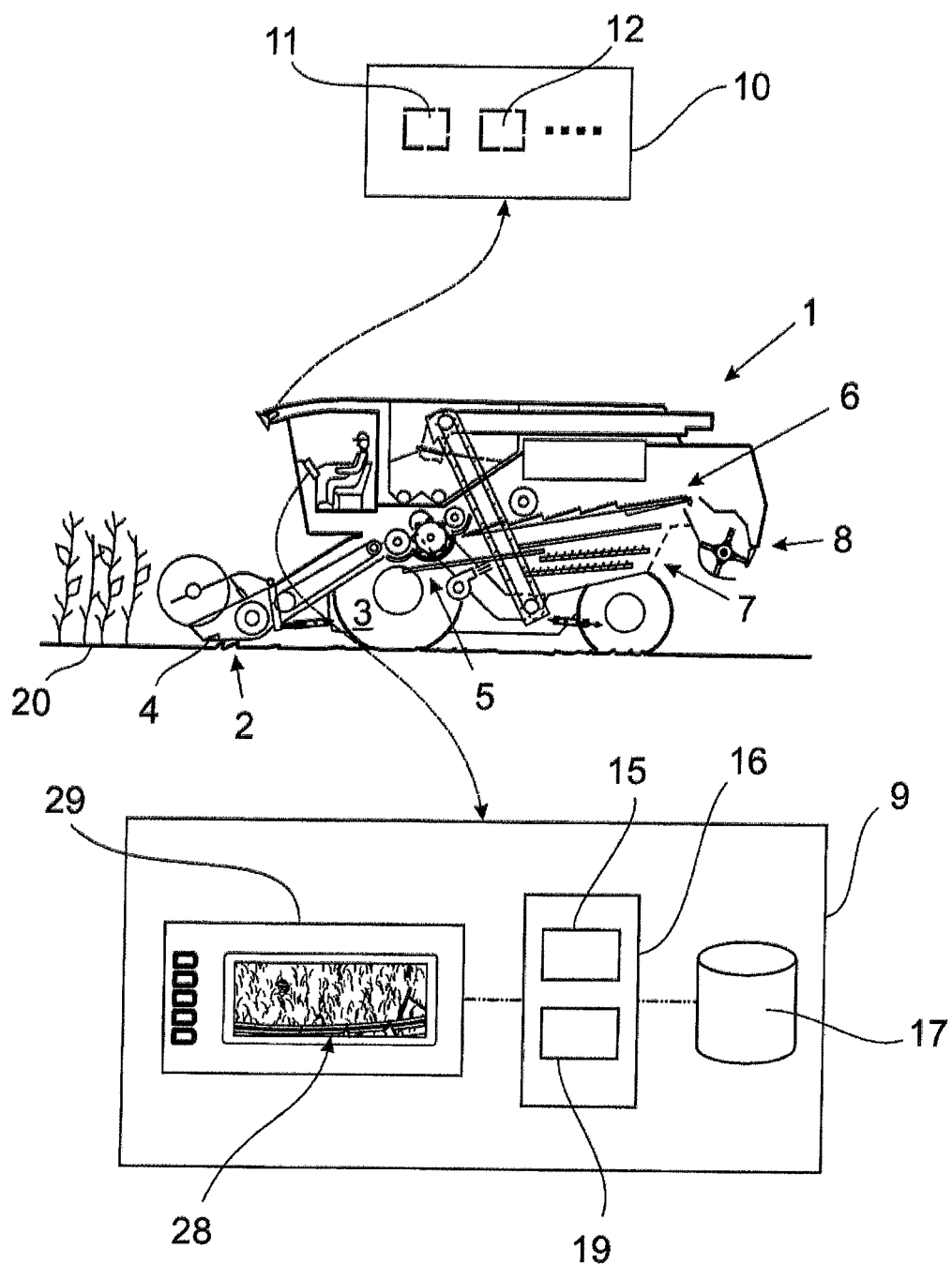
FIG. 2 shows a highly schematic representation of the driver assistance system of the working machine according to FIG. 1, and FIGS. 3a-3d show an exemplary sequence of a sensor fusion according to the invention in the case of a working machine according to FIG. 1.

The driver assistance system 9 comprises an image processing system 15 for processing the starting camera images 14. In this case and preferably, the image processing system 15 is made available by a computing device 16 of the driver assistance system 9, which is coupled to a digital data storage unit 17 in regard to data (FIG. 2). According to the invention, the starting camera images 14 (FIG. 3a) are segmented into image segments 18 by the image processing system 15 according to a segmentation rule. Different variants of the segmentation rule are advantageous depending on the application. For example, the segmentation can be carried out based on the color distribution in the particular starting camera image. With respect to preferred methods for segmentation, reference is made to the German patent application DE 10 2016 118 227.3 which belongs to the applicant and the contents of which are incorporated by reference.

A sensor fusion module 19 is provided in addition to the image processing system 15 or is integrated into the image processing system 15, wherein the segmented camera images 14' (FIG. 3b)) are combined, by the sensor fusion module 19, with the sensor information from the laser-based sensor system 12. A camera image 14" combined in this way is indicated in FIG. 3c).

In this case and preferably, the sensor information from the laser-based sensor system 12 is height information which is based on the field plane 20. In this case, the laser-based sensor system is preferably equipped with at least one laser-based LIDAR sensor.

FIG. 3c) shows, for one image cut-out, that precisely one piece of height information is assigned to at least one portion of the image segments 18 in each case within the scope of the sensor fusion. The piece of height information has been derived, in this case and preferably, from the sensor information from the laser-based sensor system 12 for the surroundings segment in the relevant surroundings area 13 that corresponds to the particular image segment 18. In this case, it can also be provided, in principle, that more than one piece of height information, in particular multiple pieces of height information, is/are assigned to one image segment 18. The single—in this case and preferably—piece of height information regarding an image segment 18 can be, for example, the maximum value of all pieces of height information detected for the corresponding surroundings segment, or the mean value thereof.

In FIG. 3c), the pieces of height information are each indicated as a numerical value.

In a subsequent method step, it is preferably provided that the image segments 18 are classified by the image processing system 15, according to a classification rule, into classes having class properties, and therefore a class is assigned to each of the image segments 18. In this case, it is essential that not only the characteristics of the relevant image segment 18, but also the sensor information from the laser-based sensor system 12 are taken into account in the classification. Due to the fact that the sensor information from the laser-based sensor system 12 is additionally taken into account, a particularly high reproducibility of the classification of the image segments 18 results.

The classification rule can also provide that the image segments surrounding the image segment 18 are taken into account in the determination of the particular class for an image segment 18. Therefore, in the classification of an image segment as a "living obstacle", for example, use can be made of the fact that a living obstacle, at least a person, regularly creates a trail in the crop, which is not represented in the present drawing, however.

Figure 3:
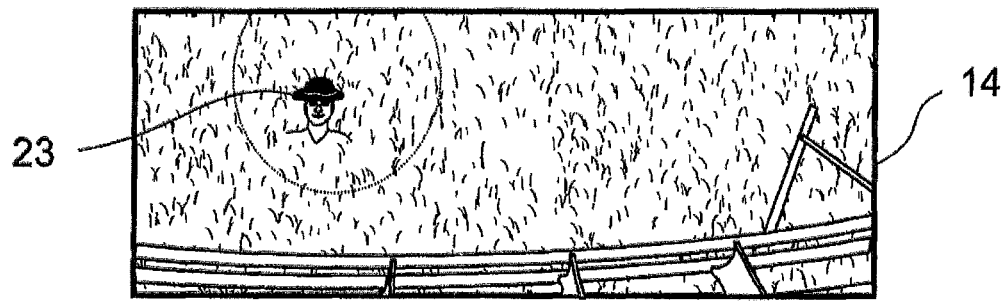
Figure 3:
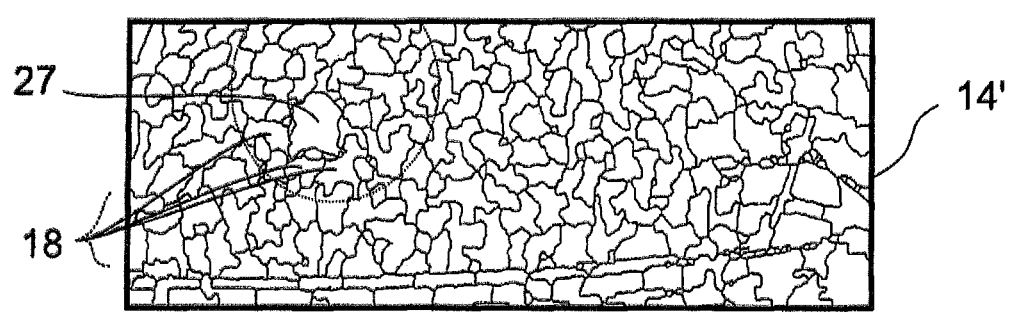
Figure 3:
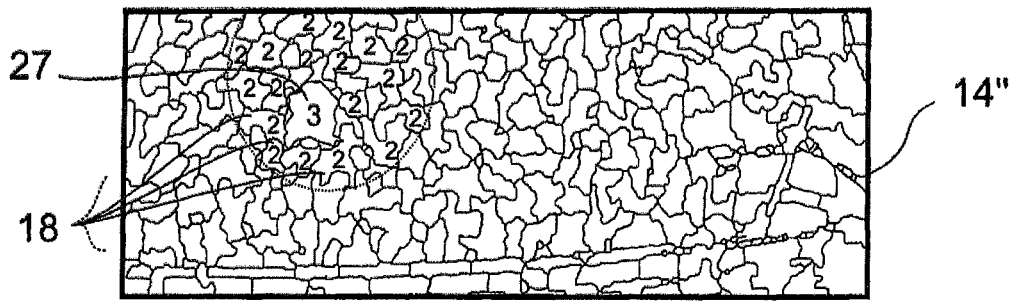
Figure 3:
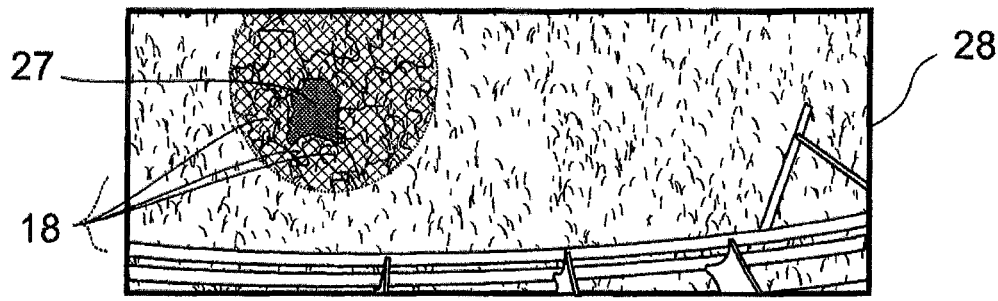

The class property of a class contained in the classification rule can be defined in different ways. In one preferred variant, the class property of a class is defined by the existence of crop 21 to be harvested. Alternatively or additionally, the class property of a class is defined by the existence of standing crop 22. Alternatively or additionally, the class property of a class is defined by the existence of a living obstacle 23. Alternatively or additionally, the class property of a class is defined by the existence of a non-living obstacle. Alternatively or additionally, the class property of a class is defined by the existence of a driving lane 24. Alternatively or additionally, the class property of a class is defined by the existence of a harvested area 25. Alternatively or additionally, the class property of a class is finally defined by the existence of a crop edge 26. The exemplary sequence according to FIG. 3 is directed to the situation in which a living obstacle 23, which is a person in this case, is located in the relevant surroundings area 13. The person 23 is apparent in FIG. 3a).

Within the scope of the segmentation according to the invention, the person 23 shown in FIG. 3a) is assigned, in this case and preferably, an image segment 27 shown in FIG. 3b, which is provided with the piece of height information "3" within the scope of the sensor fusion, according to FIG. 3c), while the surrounding image segments 18 are provided with the piece of height information "2". In this case, the piece of height information "3" stands for a greater height than the piece of height information "2".

Within the scope of the subsequent classification, it is inferred, from factors such as the shape, the volume, or the color of the segment 27 in combination with the factor of the piece of height information "3", that the image segment 27 is to be allocated to the class of an obstacle. Provided the sequence of camera images additionally reveals a spatial fluctuation of the image segment 27, which is established in the classification rule, the class "living obstacle" can be assigned to the image segment 27. Other examples for the determination of the class of an image segment 18 are conceivable. In this case, it becomes clear that, by way of the approach according to the invention, a reproducible classification of image segments 18 is combined with the processing of small amounts of data. Therefore, the method according to the invention can be implemented using comparatively low computing power and, in particular, during an on-going working operation, in particular in real time.

The method according to the invention is also advantageous, however, with respect to the display of the detected characteristics of the relevant surroundings area 13. Preferably, a display image 28 is generated by the image processing system 15, in which the starting camera image 14 is superimposed with at least a portion of the classified image segments 18, 27. This is shown in FIG. 3d) using the example of an image segment 27 representing a living obstacle, which is the person 23 in this case. This corresponds to the fundamental approach of so-called "augmented reality", according to which, location-specific, artificially generated additional information is superimposed on a largely unprocessed camera image.

A particularly clear representation results by way of the fact that the image segments 18 are represented in different colors in the display image 28 depending on the particular assigned class. Instead of a different color, it is also possible to utilize different shadings or the like.

Furthermore, it can be provided that a selective display of image segments 18 is implemented in the display image 28, i.e., for example, image segments 18 of predetermined classes are not displayed.

The driver assistance system 9 can utilize the results of the method according to the invention in different ways. Preferably, it is provided that the driver assistance system 9 comprises a human-machine interface 29, wherein a control action is the output of the display image 28 via the human-machine interface 29. Alternatively or additionally, it can be provided that the output of a warning message is output, as a control action, via the human-machine interface 29 depending on the classified image segments 18, in particular depending on the position of the classified image segments 20.

In a higher degree of automation of the working machine 1, it is conceivable that the control action of the driver assistance system 9 is the execution of an emergency routine in the event that the classified image segments 18 in the future route 30 of the working machine 1 represent an obstacle. This emergency routine can be a stop routine for stopping the working machine 1 and/or an evasive-maneuver routine for moving the working machine 1 out of the way of the obstacle.

According to yet another teaching, which has independent significance, the self-propelled agricultural working machine 1 for carrying out a method according to the invention, which is explained above, is claimed as such. Reference is made to all the comments made in this regard.

In one particularly preferred embodiment, it is provided that the driver assistance system 9, as mentioned above, comprises a computing device 16 which can make the above-described image processing system 15 available. Alternatively or additionally, it can be provided that the sensor fusion module 19 is made available by the driver assistance system 9 of the working machine 1, in particular by the computing device 16.

Alternatively, it is conceivable that at least one portion of the image processing system 15 and/or at least one portion of the sensor fusion module 19 is implemented on a computer which is operated separately from the working machine 1, in particular by a contract service provider or the like.

In summary, it can be stated that, with the aid of the approach according to the invention, not only can a detection of predetermined characteristics of the relevant surroundings area 13 be implemented using simple means, but also even complex surroundings conditions can be displayed in a particularly clear way.

LIST OF REFERENCE SIGNS 1 working machine
2 front attachment
3-8 working element
9 driver assistance system
10 sensor arrangement
11 camera-based sensor system
12 laser-based sensor system
13 relevant surroundings area
14 starting camera image
15 image processing system
16 computing device
17 data storage unit
18 image segment
20 sensor fusion module
21 field plane
22 crop to be harvested
23 standing crop
23 living obstacle
24 driving lane
25 harvested area
26 crop edge
27 person segment
28 display image
29 human-machine interface
30 route

What is claimed is:

1. A method for the operation of a self-propelled agricultural working machine comprising at least one working element and comprising a driver assistance system for generating control actions within the working machine, comprising the following steps:
   generating surroundings information with a sensor arrangement comprising a camera-based sensor system and a laser-based sensor system, each of which generates sensor information regarding a predetermined, relevant surroundings area of the working machine, wherein the sensor information of the camera-based sensor system is present as starting camera images,
   processing the starting camera images with an image processing system of the driver assistance system by segmenting the starting camera images into image segments by the image processing system according to a segmentation rule, and combining the segmented camera images with the sensor information from the laser-based sensor system using a sensor fusion module, and
   generating with the driver assistance system a control action of the agricultural working machine based on the processed surroundings information,
   wherein the image segments are classified by the image processing system according to a classification rule into classes having class properties, so that a class is assigned to each of the image segments, and the sensor information from the laser-based sensor system is taken into account in the classification.

2. The method as claimed in claim 1, wherein the sensor information of the laser-based sensor system is height information relative to a field plane.

3. The method as claimed in claim 1, wherein during the step of combining, precisely one piece of height information is assigned to at least one portion of the image segments, the piece of height information being derived from the sensor information of the laser-based sensor system for a surroundings segment which corresponds to the particular image segment.

4. The method as claimed in claim 1, wherein the class property of a class is defined by at least one of the following:
   the existence of the crop to be harvested,
   the existence of a standing crop,
   the existence of a living obstacle,
   the existence of a non-living obstacle,
   the existence of a driving lane,
   the existence of a harvested area, or
   the existence of a crop edge.

5. The method as claimed in claim 1, further comprising the step of generating a display image by the image processing system, in which the starting camera image is superimposed with at least a portion of the classified image segments.

6. The method as claimed claim 5, wherein the image segments are represented in different colors in the display image depending on a particular assigned class.

7. The method as claimed in claim 5, wherein image segments of predetermined classes are not displayed in the display image.

8. The method as claimed in claim 5, wherein the driver assistance system comprises a human-machine interface and the control action is an output of the display image via the human-machine interface and/or, depending on the classified image segments, the output of a warning message via the human-machine interface.

9. The method as claimed in claim 1, wherein the control action of the driver assistance system is the execution of an emergency routine in the event that the classified image segments in a future route of the working machine represent an obstacle.

10. The method as claimed in claim 9, wherein the emergency routine encompasses a stop routine for stopping the working machine and/or an evasive-maneuver routine for moving the working machine out of the way of the obstacle.

11. A self-propelled agricultural working machine comprising:
   at least one working element,
   a driver assistance system configured for generating control actions within the working machine,
   a sensor arrangement configured for generating surroundings information, the sensor arrangement comprising a camera-based sensor system and a laser-based sensor system, each of which generates sensor information regarding a predetermined, relevant surroundings area of the working machine, wherein the sensor information of the camera-based sensor system is present as starting camera images,
   an image processing system configured for processing the starting camera images by segmenting the starting camera images into image segments according to a segmentation rule, and a sensor fusion module configured for combining the segmented camera images with the sensor information from the laser-based sensor system using a sensor fusion module, wherein the image processing system is configured to classify image segments according to a classification rule into classes having class properties, so that a class is assigned to each of the image segments, and the sensor information from the laser-based sensor system is taken into account in the classification.

12. The self-propelled agricultural working machine as claimed in claim 11, wherein the sensor fusion module is made available by the driver assistance system of the working machine.

* * * * *